United States Patent
Okita et al.

[11] Patent Number: 5,700,541
[45] Date of Patent: Dec. 23, 1997

[54] MAGNETIC RECORDING MEDIUM

[75] Inventors: Tsutomu Okita; Toshio Ishida, both of Kanagawa, Japan

[73] Assignee: Fuji Photo Film Co., Ltd., Japan

[21] Appl. No.: 571,068

[22] Filed: Dec. 12, 1995

[30] Foreign Application Priority Data

Dec. 13, 1994 [JP] Japan .................................. 6-332172

[51] Int. Cl.$^6$ ...................................................... G11B 5/71
[52] U.S. Cl. .................. 428/65.4; 428/694 BS; 428/694 BM; 428/694 BP; 428/900
[58] Field of Search ............. 428/694 BS, 694 BM, 428/694 BP, 900, 65.4

[56] References Cited

U.S. PATENT DOCUMENTS

| | | | |
|---|---|---|---|
| 3,547,693 | 12/1970 | Huguenard et al. | 117/235 |
| 4,188,301 | 2/1980 | Naruse et al. | 252/62.54 |
| 4,201,809 | 5/1980 | Ogawa et al. | 428/65 |
| 4,522,885 | 6/1985 | Funahashi et al. | 428/422 |
| 4,587,157 | 5/1986 | Brock et al. | 428/216 |
| 4,666,769 | 5/1987 | Miyata et al. | 428/323 |
| 4,675,250 | 6/1987 | Kanai et al. | 428/403 |
| 4,696,869 | 9/1987 | Funahashi et al. | 428/695 |
| 5,391,814 | 2/1995 | Kai et al. | 560/197 |

FOREIGN PATENT DOCUMENTS

62-164216  7/1987  Japan .

*Primary Examiner*—Stevan A. Resan
*Attorney, Agent, or Firm*—Brinks Hofer Gilson & Lione

[57] ABSTRACT

A magnetic recording medium is described, which comprises a nonmagnetic support having provided thereon a lower layer comprising nonmagnetic or ferromagnetic particles and a binder resin, and an upper layer provided on the lower layer comprising ferromagnetic metal particles and a binder resin, wherein at least said upper layer contains as a lubricant a compound represented by the following formula (1) in an amount of 1% by weight or more based on the amount of the ferromagnetic metal particles contained in the upper layer:

$$R^1-COO-R-OCO-R^2 \qquad (1)$$

wherein R represents $-(CH_2)_n-$ or a divalent group derived from $-(CH_2)_n-$ which may contain an unsaturated bond, in which n is an integer of from 1 to 10, or R represents $$-(CH_2CH)-;$$
$$\quad\ |$$
$$\quad CH_3$$

and $R^1$ and $R^2$ are the same or different and each represents a chain unsaturated hydrocarbon group having from 12 to 26 carbon atoms.

7 Claims, No Drawings

MAGNETIC RECORDING MEDIUM

FIELD OF THE INVENTION

The present invention relates to a magnetic recording medium. More particularly, the present invention relates to a thin-film-coated magnetic recording medium containing ferromagnetic metal particles, which is excellent in running properties, durability, and storage stability.

BACKGROUND OF THE INVENTION

In the field of magnetic recording, the desire for higher recording densities is growing in recent years. With respect to coated-type magnetic recording media, various expedients have been proposed for reducing the particle size of ferromagnetic particles, improving the dispersibility thereof, and increasing the loading thereof in a magnetic layer. A more effective expedient is to employ ferromagnetic metal particles or a hexagonal ferrite having excellent magnetic characteristics.

In a magnetic recording medium, the magnetic layer is required to have a higher degree of surface smoothness for improving electromagnetic characteristics. Consequently, conventionally known lubricants have come to be ineffective in imparting sufficient performances with respect to running properties, suitability for repetitions of running, and durability. With the spread of minicomputers and personal computers in office appliances, magnetic recording disks for use as external memory media have spread remarkably. These magnetic recording disks have come to be used and stored in a wide range of temperature/humidity conditions and also come to be used in a dusty atmosphere. Accordingly, lubricating performances which withstand a wide range of environmental conditions are required.

The conventionally employed lubricants include mineral oils, silicone oils, higher alcohols, higher fatty acids, fatty acid esters, animal oils such as beef tallow, whale oil, and shark oil, and vegetable oils. However, all the conventional lubricants are insufficient in durability. Frequently employed for improving durability is the well known technique of using a monoester of a saturated or unsaturated fatty acid with alcohol, as disclosed in, e.g., JP-B-51-39081 (the term "JP-B" as used herein means an "examined Japanese patent publication"). However, such a monoester is insufficient in durability in magnetic recording media for high-density recording having an ultra-smooth magnetic-layer surface. Fatty acid esters of polyhydric alcohols are disclosed in, e.g., JP-B-41-18063 (esters of carboxylic acid and dihydric alcohol), JP-B-58-31655 (glyceride triesters of oleic acid), JP-A-54-21806 (fatty acid esters of alcohol containing three or more unsaturated bonds), and JP-A-61-198422 (esters of polyhydric alcohol and fatty acid) (the term "JP-A" as used herein means an "unexamined published Japanese patent application"). However, with any of these esters, a magnetic recording medium satisfactory in both durability and electromagnetic characteristics could not be obtained.

Examples of the fatty acid monoester having an unsaturated bond include oleyl oleate as described in JP-B-4-4917. However, this lubricant is insufficient in durability, probably because the lubricant is a monoester and hence has poor interaction with a binder resin to volatilize during long-term storage or during use under high-temperature conditions. JP-A-61-280025 discloses an unsaturated fatty acid monoester obtained by esterifying part of the —OH groups of the polyglycerol with a fatty acid. However, this lubricant also is insufficient in durability, probably because the lubricant shows too high compatibility with a binder resin due to the remaining —OH groups and, hence, the lubricant dissolves into the magnetic layer and is less apt to ooze out to the magnetic-layer surface and to perform its function. It is also thought that since the —OH groups react with a polyisocyanate contained as a hardener in the binder resin, the unsaturated fatty acid monoester inhibits the reaction of the polyisocyanate with the binder resin to reduce the durability of the magnetic layer.

Examples of the monoester further include the fatty acid esters of unsaturated alcohol such as vinyl stearate disclosed in JP-B-47-12950 and the combinations of a fatty acid ester, a fatty acid amide, and a fatty acid as disclosed in JP-A-55-139637. Further, JP-A-58-164025 discloses unsaturated fatty acid esters, and JP-A-59-148131 discloses combinations of unsaturated fatty acid esters and hydrocarbons. Furthermore, JP-A-62-1118 discloses unsaturated fatty acid esters of branched alcohols. However, all of these prior art lubricants are insufficient in durability.

When the conventional lubricants enumerated above are used in an increased amount in order to enhance their lubricating effect, the resulting magnetic coating film has impaired mechanical strength and tends to peel off. As a result, magnetic-layer debris cause fouling of the recording or reproducing apparatus along the running route of the recording medium, or the recording medium cannot have sufficient durability. In particular, the magnetic recording media disclosed in the above-cited references have a drawback that when run in a high-temperature or high-humidity atmosphere, they show insufficient durability to frequently cause dropouts and errors.

As another expedient for improving durability, the technique of incorporating fine particles of an abrasive material, carbon black, or the like into a magnetic layer has been proposed and put to practical use. However, this technique has a problem that the incorporation of an abrasive material or carbon black into a magnetic layer for the purpose of improving the durability of the magnetic layer impairs electromagnetic characteristics.

SUMMARY OF THE INVENTION

An object of the present invention is to provide a magnetic recording medium comprising a magnetic layer having an exceedingly smooth surface and having satisfactory performances in running properties, suitability for repetitions of running, and durability.

Another object of the present invention is to provide a magnetic recording medium which shows high durability even when used and stored in a wide range of atmospheres and even when used in a dusty atmosphere.

Still another object of the present invention is to provide a magnetic recording medium which shows a reduced error rate even when used and stored in a wide range of atmospheres and even when used in a dusty atmosphere.

These and other objects of the present invention have been accomplished with magnetic recording medium comprising a nonmagnetic support having provided thereon a lower layer comprising nonmagnetic or ferromagnetic particles and a binder resin, and an upper layer provided on the lower layer comprising ferromagnetic metal particles and a binder resin, wherein at least said upper layer contains as a lubricant a compound represented by the following formula (1) in an amount of 1% by weight or more based on the amount of the ferromagnetic metal particles contained in the upper layer:

$$R^1\text{—COO—R—OCO—R}^2 \tag{1}$$

wherein R represents —$(CH_2)_n$— or a divalent group derived from —$(CH_2)_n$— which may contain an unsaturated bond, in which n is an integer of from 1 to 10, or R represents

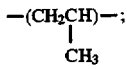

and $R^1$ and $R^2$ are the same or different and each represents a chain unsaturated hydrocarbon group having from 12 to 26 carbon atoms.

DETAILED DESCRIPTION OF THE INVENTION

According to the present invention, a magnetic recording medium combining a high degree of running durability and storage stability is obtained, which recording medium has never been obtainable with any conventionally known technique. Namely, the present invention has succeeded in realizing a high-density magnetic recording medium suitable for practical use. Since the lubricant represented by formula (1) for use in the present invention has a low viscosity for its molecular weight because of the pressure of unsaturated bonds incorporated therein, it shows high fluid lubricity. Moreover, the lubricant does not volatilize off during running because of the relatively high molecular weight thereof, so that satisfactory running durability is obtained even in long-term repetitions of use. Furthermore, since the lubricant is used in a small amount in the present invention, a magnetic recording medium having high magnetic characteristics has been realized.

In a medium for high-density recording, the upper magnetic layer is required to have a reduced thickness for attaining satisfactory overwriting properties. However, since the amount of a lubricant which can be contained in the magnetic coating fluid is limited due to the reduced thickness of the magnetic layer, the amount of the lubricant which oozes out to the magnetic-layer surface becomes smaller accordingly, making the retention of durability difficult. One expedient for increasing the amount of a lubricant oozing out to the magnetic-layer surface is to increase the amount of the lubricant incorporated in the coating fluid for forming the upper layer (magnetic layer). However, the increased addition amount of a lubricant results in a magnetic layer with a rough surface, or with reduced surface smoothness, making it impossible to obtain a high degree of magnetic characteristics. In the present invention, the lubricant incorporated in a small amount oozes out to the magnetic-layer surface to perform its lubricating function, whereby satisfactory durability can be obtained. In addition, since the lubricant used in this invention has two unsaturated structures and two ester bonds, it has a high affinity for a binder resin and, hence, is not gradually depleted by sliding with a recording/reproduction head during long-term repetitions of running. As a result, a high degree of running durability can be attained even in repetitions of use. The prevention of lubricant depletion during running is presumed to be attributable to the moderate compatibility of the lubricant represented by formula (1) with the binder resin due to the lipophilic nature of the group R sandwiched between the two ester groups, which R is a diol residue having a given number of carbon atoms. In formula (1), which represents the compound for use in the present invention, R represents —$(CH_2)_n$— or a divalent group derived from —$(CH_2)_n$— which may contain an unsaturated bond, or R represents the following group:

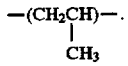

n is an integer of from 1 to 10. $R^1$ and $R^2$ may be the same or different and each represents a chain unsaturated hydrocarbon group having from 12 to 26 carbon atoms.

The chain hydrocarbon group may be linear or branched; however, preferably, $R^1$ and $R^2$ are both a linear unsaturated group. In this case, $R^1$ and $R^2$ especially preferably have the same structure. The unsaturated bonds each may be a double bond or a triple bond, but is preferably a double bond. Each of $R^1$ and $R^2$ has one or more such unsaturated bonds. The double bond may be cis or trans.

$R^1$ and $R^2$ each has from 12 to 26, preferably from 14 to 20, and more preferably from 14 to 18, carbon atoms. If the number of carbon atoms contained in $R^1$ or $R^2$ is less than 12, the lubricant is so volatile that it passes off from the magnetic-layer surface during running to cause sticking. If the number of carbon atoms contained therein exceeds 26, the lubricant molecule has reduced mobility and, hence, the lubricant is less apt to ooze out to the magnetic-layer surface, resulting in impaired durability.

R is preferably a residue of a linear dihydric alcohol having —OH at each end, and n is preferably from 4 to 10. If n is too small, impaired durability in repetitions of running results. If n is too large, not only the lubricant has poor handleability because of the increased viscosity thereof, but also poor durability results.

The compound represented by formula (1) for use in the present invention is a diester of a diol represented by HO—R—OH with unsaturated fatty acids respectively represented by $R^1$—COOH and $R^2$—COOH.

Examples of the unsaturated fatty acids include linear unsaturated fatty acids such as 4-dodecenoic acid, 5-dodecenoic acid, 11-dodecenoic acid, cis-9-tridecenoic acid, myristoleic acid, 5-myristoleic acid, 6-pentadecenoic acid, 7-palmitoleic acid, cis-9-palmitoleic acid, 7-heptadecenoic acid, oleic acid, elaidic acid, cis-6-octadecenoic acid, trans-11-octadecenoic acid, cis-11-eicosenoic acid, cis-13-docosenoic acid, 15-tetracosenoic acid, 17-hexacosenoic acid, cis-9, cis-12-octadienoic acid, trans-9,trans-12-octadienoic acid, cis-9,trans-11,trans-13-octadecatrienoic acid, cis-9,cis-12, cis-15-octadecatrienoic acid, and stearolic acid; and branched unsaturated fatty acids such as 5-methyl-2-tridecenoic acid, 2-methyl-9-octadecenoic acid, 2-methyl-2-eicosenoic acid, and 2,2-dimethyl-11-eicosenoic acid.

Examples of the diol include linear saturated diols in which the hydroxyl groups are present at both ends, such as ethylene glycol, trimethylene glycol, 1,4-butanediol, 1,5-pentanediol, 1,6-hexanediol, 1,7-pentanediol, 1,8-octanediol, 1,9-nonanediol, and 1,10-decanediol;

branched saturated diols such as propylene glycol, 1,2-butanediol, 1,3-butanediol, 2,4-pentanediol, 2,2-dimethyl-1, 3-propanediol, 2,5-hexanediol, 2-ethyl-1,3-hexanediol, 3-methyl-1,6-hexanediol, 1-methyl-1,7-pentanediol, 2,6-dimethyl-1,7-pentanediol, 1-methyl-1,8-nonanediol;

linear unsaturated diols such as 2-butene-1,4-diol, 2,4-hexadiene-1,6-diol, and 3-pentene-1,7-diol; and branched unsaturated diols such as 2-methyl-2-butene-1, 4-diol, 2,3-dimethyl-2-butene-1,4-diol, and 2,6-dimethyl-3-hexene-1,6-diol.

Of the aforementioned esters, especially preferable compounds for use in the present invention are esters of linear unsaturated fatty acids such as myristoleic acid, 5-myristoleic acid, 7-palmitoleic acid, cis-9-palmitoleic acid, oleic acid, elaidic acid, cis-6-octadecenoic acid (petroselinic acid), trans-6-octadecenoic acid (petroselaidic acid), trans-11-octadecenoic acid (vaccenic acid), cis-11-eicosenoic acid, cis-13-docosenoic acid (erucic acid), and cis-9, cis-12-octadienoic acid (linoleic acid) with diols such as diethylene glycol, trimethylene glycol, 1,4-butanediol, 1,5-pentanediol, 1,6-hexanediol, 1,7-pentanediol, 1,8-octanediol, 1,9-nonanediol, and 1,10-decanediol. Preferred of these are esters of those linear unsaturated fatty acids with diolS such as 1,4-butanediol, 1,5-pentanediol, 1,6-hexanediol, 1,7-pentanediol, 1,8-octanediol, 1,9-nonanediol, and 1,10-decanediol.

The amount of the lubricant of the invention incorporated in the upper layer is 1 part by weight or more, preferably 3 parts by weight or more, and particularly preferably 5 parts by weight or more, per 100 parts by weight of the ferromagnetic metal particles contained in the upper layer. If the lubricant is also incorporated in the lower layer, the amount thereof is 1 part by weight or more, preferably 3 parts by weight or more, and particularly preferably 5 parts by weight or more, per 100 parts by weight of the fine particles contained in the lower layer. It is preferred to incorporate the lubricant into both the upper and lower layers. The upper limit of the lubricant amount in each layer is 20% by weight. Too large lubricant amounts result in a rough magnetic-layer surface and hence impaired magnetic characteristics, while too small lubricant amounts result in poor durability.

The term "fine particles" herein means ferromagnetic particles when the lower layer is a magnetic layer, and means nonmagnetic particles when the lower layer is a nonmagnetic layer. The term "nonmagnetic particles" herein means the nonmagnetic inorganic particles described later.

The incorporation of a lubricant into a lower layer is effective in improving durability because the lubricant oozes out to the magnetic-layer surface in a large amount. Although this applies in this invention also, the magnetic recording medium of the present invention is advantageous in that the desired effect is produced with a small amount of the lubricant. In addition, when nonmagnetic particles having a BET specific surface area of 150 $m^2/g$ or less are incorporated into the lower layer in an amount of at least 60% by weight, preferably at least 90% by weight, based on the solid inorganic components, the magnetic layer tends to have a smooth surface. As a result, the magnetic layer has high magnetic characteristics and improved running durability. The smoothness of the magnetic-layer surface is presumed to be attributable to the use of the nonmagnetic inorganic particles in the lower-layer-forming coating fluid, which particles show satisfactory dispersibility and tend less to aggregate. It is also thought that since the nonmagnetic inorganic particles have a small specific surface area, the lubricant is adsorbed onto the nonmagnetic inorganic particles in a reduced amount and, as a result, oozes out to the magnetic-layer surface in an increased amount, and this contributes to an improvement in durability.

The ferromagnetic metal particles for use in the magnetic layer of the present invention have a particle size of from 30 to 80$m^2/g$ by a specific surface area and a crystallite size of from 80 to 300 Å determined by X-ray diffractometry. Too small specific surface areas thereof are undesirable because particles are unsuitable for sufficiently coping with high-density recording. Too large specific surface areas thereof are undesirable because such particles cannot be sufficiently dispersed so that a magnetic layer having a smooth surface cannot be formed, also making it impossible to cope with high-density recording.

The ferromagnetic metal particles preferably contain at least Fe. Examples of the material of these metal particles include elemental metals or alloys each mainly comprising Fe, Fe—Co, Fe—Ni, or Fe—Ni—Co. In order to provide the magnetic recording medium of the present invention with high-density recording, the ferromagnetic metal particles are required to have satisfactory magnetic characteristics in addition to the small particle size described above. Specifically, the ferromagnetic metal particles have a saturation magnetization of 110 emu/g or more, preferably 120 emu/g or more, and a coercive force of 800 Oe (oersted) or more, preferably from 900 to 1,200 Oe. The aspect ratio (major axis length/minor axis length) thereof is usually 3 or more, preferably from 5 to 15.

For improving properties, a non-metal, e.g., B, C, Al, Si, or P, may be added to the material constituting the ferromagnetic metal particles. The surface of the metal particles is usually covered with an oxide layer for imparting chemical stability.

The water content of the ferromagnetic metal materials is preferably from 0.01 to 2% by weight. The pH of the ferromagnetic metal particles is preferably optimized by combining a binder, and the pH is preferably from 4 to 12, more preferably from 5 to 10.

The upper layer of the magnetic recording medium of the present invention is formed on a lower layer. This lower layer may be a nonmagnetic layer mainly comprising nonmagnetic particles and a binder resin, or may be a magnetic layer mainly comprising ferromagnetic particles and a binder resin. However, the lower layer is preferably a nonmagnetic layer from the standpoint of reducing the thickness of the upper layer to attain surface properties, electromagnetic characteristics, and the like. If a magnetic layer is formed as the lower layer, the ferromagnetic particles used therefor are not particularly limited. Usually however, γ-iron oxide, Co-containing iron oxide, barium ferrite, other ferromagnetic metal particles, or the like is used.

The layers constituting the recording medium of the present invention may contain nonmagnetic conductive particles. In particular, use of carbon black is preferred for preventing static build-up. For this purpose, the carbon black preferably has a specific surface area of from 5 to 500 $m^2/g$, a DBP absorption of from 10 to 1,500 ml/100 g, a particle size of from 5 to 300 mµ, a pH of from 2 to 10, a water content of from 0.1 to 10%, and a tap density of from 0.1 to 1 g/ml. Specific examples of the carbon black usable in the present invention include BLACKPEARLS 2000, 1300, 1000, 900, 800, 700, and VULCAN XC-72 manufactured by Cabot Co., Ltd.; #80, #60, #55, #50, and #35 manufactured by Asahi Carbon Co., Ltd.; #3950B, #2400B, #2300, #900, #1000, #30, #40, and #10B manufactured by Mitsubishi Chemical Corp.; CONDUCTEX SC, RAVEN 150, 50, 40, and 15 manufactured by Columbian Carbon Co., Ltd.; and Ketjen Black EC, Ketjen Black ECDJ-500, and Ketjen Black ECDJ-600 manufactured by Lion Akzo Co., Ltd. The carbon black may be surface-treated with a dispersant or other agent or grafted with a resin before use. The surface of the carbon black may be partly graphitized before use. Further, before being added to a magnetic coating fluid, the carbon black may be dispersed into a binder. In the case of using the carbon black in the upper layer, the amount thereof is preferably from 0.1 to 30% by weight based on the ferromagnetic particles. The amount of the carbon black incorporated in the lower layer is preferably from 3 to 20% by weight based on the amount of all nonmagnetic particles. The carbon black incorporated in the upper or lower layer functions to prevent static build-up in the layer, to reduce the coefficient of friction of the layer, as a light screen for the layer, and to improve the strength of the layer. Such effects are produced in different degrees depending on the kind of carbon black used. Therefore, it is possible in the present invention to properly use different carbon blacks in different combinations and amounts according to the purpose on the basis of the above-described properties including particle size, oil absorption, electrical conductivity, and pH. Examples of the carbon black usable in the present invention are described in, for example, *Carbon Black Handbook*, edited by Carbon Black Association.

Among the nonmagnetic particles for use in the nonmagnetic layer of the present invention, examples of nonmagnetic inorganic particles include α-alumina having an α-alumina structure content of 90% or more, β-alumina, γ-alumina, silicon carbide, chromium oxide, cerium oxide, α-iron oxide, corundum, silicon nitride, titanium carbide, titanium oxide, silicon dioxide, boron nitride, zinc oxide, calcium carbonate, calcium sulfate, and barium sulfate. These nonmagnetic inorganic materials may be used alone or in combination thereof. Among these, preferred are α-iron oxide, titanium oxide, silica and alumina because they have a spherical form.

These nonmagnetic particles preferably have an average particle size of from 0.002 to 5 μm, preferably from 0.01 to 3 μm. If necessary, nonmagnetic particulate materials having different particle sizes may be used in combination, or a single nonmagnetic particulate material having a widened particle diameter distribution may be used so as to produce the same effect.

The specific surface area of the nonmagnetic inorganic particles is usually from 1 to 150 $m^2/g$, preferably from 30 to 100 $m^2/g$, and more preferably from 40 to 80 $m^2/g$, from the standpoint of ensuring the oozing of the lubricant as described hereinabove. Too small specific surface areas of the nonmagnetic particles result in enhanced surface roughness, while nonmagnetic inorganic particles having too large a specific surface area have poor dispersibility, resulting in enhanced surface roughness.

These nonmagnetic particulate materials preferably have a tap density of from 0.3 to 2 g/ml, a water content of from 0.1 to 5%, and a pH of from 2 to 11.

The nonmagnetic inorganic particles for use in the present invention may have any of acicular, spherical, and cubical forms. Specific examples of the nonmagnetic inorganic particles for use in the present invention include AKP-20, AKP-30, AKP-50, and HIT-50 manufactured by Sumitomo Chemical Company, Limited; G5, G7, and S-1 manufactured by The Nippon Chemical Industrial Co., Ltd.; TF-100, TF-120, and TF-140 manufactured by Toda Kogyo Co., Ltd.; TT055 series and ET300W manufactured by Ishihara Sangyo Kaisha, Ltd.; and STT30 manufactured by Titan Kogyo Co., Ltd.

Examples of abrasive materials for use in the present invention include usually employed abrasive materials such as fused alumina, silicon carbide, chromium oxide ($Cr_2O_3$), corundum, artificial corundum, diamond, artificial diamond, garnet, and emery (main components; corundum and magnetite). These abrasive materials have a Mohs' hardness of from 5 to 10, and are effective when having an average particle diameter of from 0.05 to 5 μm, preferably from 0.2 to 1.0 μm. These abrasive materials are incorporated in an amount of from 3 to 20 parts by weight per 100 parts by weight of the binder resin. If the amount thereof is less than 3 parts by weight, sufficient durability is not obtained. If the amount thereof is more than 20 parts by weight, a reduced loading results and, therefore, sufficient output is not obtained.

It is possible to properly use these abrasive materials while changing the kinds, amounts, and combination of the nonmagnetic particles contained in the nonmagnetic layer and the abrasive material contained in the magnetic layer. For example, the durability of the upper-layer surface can be improved by increasing the amount of the abrasive material incorporated into the lower layer; while the durability of the edges of the upper layer can be improved by increasing the amount of the abrasive material incorporated into the upper layer. These abrasive materials may be dispersed in a binder before being added to a magnetic coating fluid.

In the magnetic recording medium of the present invention, the thickness of the nonmagnetic support is from 1 to 100 μm, preferably from 20 to 85 μm; the thickness of the lower layer is from 1 to 5 μm, preferably from 2 to 4 μm; and the thickness of the upper layer is from 0.05 to 1.0 μm, preferably from 0.1 to 0.7 μm. An undercoat layer may be formed between the nonmagnetic support and the lower layer for improving adhesibility. The thickness of this undercoat layer is from 0.01 to 2 μm, preferably from 0.05 to 0.5 μm. A back coat layer may also be formed on the other side of the nonmagnetic support. The thickness of the back coat layer is from 0.1 to 2 μm, preferably from 0.3 to 1.0 μm. The undercoat layer and the back coat layer may be the same as known ones. In a disk-form magnetic recording medium, the constituent layers described above may be formed on either or both sides thereof.

The binder for use in the present invention may be a conventionally known thermoplastic resin, thermosetting resin, or reactive resin or a mixture thereof. The thermoplastic resin may be one having a glass transition temperature of from $-100°$ to $150°$ C., a number-average molecular weight of from 1,000 to 200,000, preferably from 10,000 to 100,000, and a degree of polymerization of about from 50 to 1,000. Examples of the thermoplastic resins include polymers or copolymers containing structural units derived from vinyl chloride, vinyl acetate, vinyl alcohol, maleic acid, acrylic acid, acrylic ester, vinylidene chloride, acrylonitrile, methacrylic acid, methacrylic ester, styrene, butadiene, ethylene, vinyl butyral, vinyl acetal, or vinyl ether; polyurethane resins; and various rubber-type resins.

Examples of the thermosetting or reactive resin include phenolic resins, epoxy resins, polyurethane thermosetting resins, urea resins, melamine resins, alkyd resins, acrylic reactive resins, formaldehyde resins, silicone resins, epoxypolyamide resins, mixtures of polyester resin and isocyanate prepolymer, mixtures of polyester polyol and polyisocyanate, and mixtures of polyurethane and polyisocyanate.

These resins are described in detail in *Plastic Handbook* published by Asakura Shoten. It is also possible to use a known resin of the electron beam-curing type for the lower layer or the upper layer. Examples of such resins and production processes therefor are described in detail in JP-A-62-256219. The above-enumerated resins can be used alone or in combination. Preferred examples of those include combinations of a polyurethane resin with at least one member selected from vinyl chloride resins, vinyl chloride-vinyl acetate resins, vinyl chloride-vinyl acetate-vinyl alcohol resins, vinyl chloride-vinyl acetate-maleic anhydride copolymers, and nitrocellulose, and further include combinations of these with polyisocyanate. The polyurethane resins may have a known structure such as polyester polyurethane, polyether polyurethane, polyether polyester polyurethane, polycarbonate polyurethane, polyester polycarbonate polyurethane, or polycaprolactone polyurethane. For obtaining further improved dispersibility and durability, it is preferred to use, according to need, one or more of the above-enumerated binders which have, incorporated therein through copolymerization or addition reaction, at least one polar group selected from —COOM, —SO$_3$M, —OSO$_3$M, —P=O(OM)$_2$, —O—P=O(OM)$_2$ (wherein M represents a hydrogen atom or an alkali metal salt group), —OH, —NQ$_2$, —N$^+$Q$_3$ (wherein Q represents a hydrocarbon group), epoxy group, —SH and —CN. The amount of the polar group is from $10^{-1}$ to $10^{-8}$ mol/g, preferably from $10^{-2}$ to $10^{-6}$ mol/g.

Specific examples of the binders for use in the present invention include VAGH, VYHH, VMCH, VAGF, VAGD, VROH, VYES, VYNC, VMCC, XYHL, XYSG, PKHH, PKHJ, PKHC, and PKFE manufactured by Union Carbide Corp.; MPR-TA, MPR-TA5, MPR-TAL, MPR-TSN, MPR-TMF, MPR-TS, and MPR-TM manufactured by Nisshin Chemical Ind., Co., Ltd.; 1000W, DX80, DX81, DX82, and DX83 manufactured by Denki Kagaku Kogyo K. K.; MR110, MR100, and 400X 110A manufactured by Nippon Zeon Co., Ltd.; Nipporan N2301, N2302, and N2304 manufactured by Nippon Polyurethane Co. Ltd.; Pandex T-5105, T-R3080, T-5201, Burnock D-400, D-210-80, Krisvon 6109, and 7209 manufactured by Dainippon Ink & Chemicals, Inc.; Byron UR8200, UR8300, RV530, and RV280 manufactured by Toyobo Co., Ltd.; Daiferamine 4020, 5020, 5100, 5300, 9020, 9022, and 7020 manufactured by Dainichiseika Color & Chemicals Mfg. Co., Ltd.; MX5004 manufactured by Mitsubishi Chemical Corp.; Sunprene SP-150 manufactured by Sanyo Chemical Industries, Ltd.; and Saran F310 and F210 manufactured by Asahi Chemical Industry Co., Ltd.

The amount of the binder used in each layer in the present invention is from 5 to 50% by weight, preferably from 10 to 30% by weight, based on the amount of the ferromagnetic particles and the nonmagnetic particles. If a vinyl chloride resin, a polyurethane resin and a polyisocyanate resin are used in combination, they are preferably used in an amount of from 5 to 100%, from 2 to 50% and from 2 to 100% by weight, respectively, based on the total amount of the binders.

If polyurethane is used in the present invention, this resin preferably has a glass transition temperature of from −50° to 100° C., an elongation at break of from 100 to 2,000%, a stress at break of from 0.05 to 10 kg/cm$^2$, and a yield point of from 0.05 to 10 kg/cm$^2$.

The magnetic recording medium of the present invention has a multilayer structure. It is, of course, possible to form the individual layers so that these layers differ from each other in binder amount, the proportion of a vinyl chloride resin, polyurethane resin, polyisocyanate, or another resin in the binder, the molecular weight of each resin contained in the magnetic layer, polar group amount, or the aforementioned physical properties of resin according to need.

Examples of the polyisocyanate for use in the present invention include isocyanates such as tolylene diisocyanate, 4,4'-diphenylmethane diisocyanate, hexamethylene diisocyanate, xylylene diisocyanate, naphthylene 1,5-diisocyanate, o-toluidine diisocyanate, isophorone diisocyanate, and triphenylmethane triisocyanate, products of the reactions of these isocyanates with polyalcohols, and polyisocyanates formed by the condensation of isocyanates. These isocyanates are commercially available under the trade names of: Colonate L, Colonate HL, Colonate 2030, Colonate 2031, Millionate MR, and Millionate MTL manufactured by Nippon Polyurethane Co., Ltd.; Takenate D-102, Takenate D-110N, Takenate D-200, and Takenate D-202 manufactured by Takeda Chemical Industries, Ltd.; and Desmodule L, Desmodule IL, Desmodule N, and Desmodule HL manufactured by Sumitomo Bayer Co., Ltd. For each of the nonmagnetic layer and the magnetic layer, these polyisocyanates may be used alone or may be used in combination of two or more thereof to take advantage of a difference in curing reactivity.

Examples of dispersants (pigment-wetting agents) that can be used in this invention include fatty acids having from 12 to 18 carbon atoms (Q$_1$COOH, wherein Q$_1$ represents an alkyl or alkenyl group having from 11 to 17 carbon atoms), such as caprylic acid, capric acid, lauric acid, myristic acid, palmitic acid, stearic acid, behenic acid, oleic acid, elaidic acid, linoleic acid, linolenic acid, and stearolic acid; metallic soaps consisting of the above-enumerated fatty acids and an alkali metal (e.g., Li, Na, K) or an alkaline earth metal (e.g., Mg, Ca, Ba); fluorinated esters of the above-enumerated fatty acids; amides of the above-enumerated fatty acids; alkylphosphoric esters of poly(alkylene oxide)s; lecithins; and trialkyl polyolefinoxy quaternary ammonium salts (the alkyls each having from 1 to 5 carbon atoms and the olefin being, e.g., ethylene, propylene). In addition, higher alcohols having 12 or more carbon atoms, or sulfuric esters thereof may be used. These dispersants may be added in an amount of from 0.5 to 20 parts by weight per 100 parts by weight of the binder resin.

Besides the compounds represented by formula (1), the following compounds are also usable as a lubricant. Examples of such lubricant compounds include fatty acids, fatty acid esters other than the aforementioned ones, silicone oils, graphite, molybdenum disulfide, boron nitride, fluorinated graphite, fluorinated alcohols, polyolefins, polyglycols, alkylphosphoric esters, and tungsten disulfide. These lubricants which are used in combination are used in an amount of from 0.1 to 50% by weight based on the total amount of the lubricants.

Part or all of the additives to be used in the present invention may be added at any step in a coating fluid preparation process. For example, it is possible: to mix the additives with ferromagnetic particles prior to a kneading step; to add the additives during the kneading of ferromagnetic particles, a binder, and a solvent; to add the additives at a dispersing step; to add the additives after dispersion; or to add the additives immediately before coating.

The nonmagnetic support for use in the present invention is not particularly limited, and an ordinarily used one may be employed. Examples of the material of the nonmagnetic support include films or various synthetic resins (e.g., polyethylene terephthalate, polyethylene, polypropylene, polycarbonates, polyethylene naphthalate, polyamides, polyamide-imides, polyimides, polysulfones, polyethersulfones, syndiotactic polystyrene), and metal foils (e.g., aluminum foil, stainless-steel foil). The nonmagnetic support usually has a thickness of from 1 to 100 μm, preferably from 25 to 85 μm.

Examples of organic solvents for use in the present invention include ketones (e.g., acetone, methyl ethyl ketone, methyl isobutyl ketone, diisobutyl ketone, cyclohexanone, isophorone, tetrahydrofuran); alcohols (e.g., methanol, ethanol, propanol, butanol, isobutyl alcohol, isopropyl alcohol, methylcyclohexanol); esters (e.g., methyl acetate, butyl acetate, isobutyl acetate, isopropyl acetate, ethyl lactate, glycol acetate); glycol ethers (e.g., glycol dimethyl ethers, glycol monoethyl ethers, dioxane); aromatic hydrocarbons (e.g., benzene, toluene, xylene, cresol, chlorobenzene); chlorinated hydrocarbons (e.g., methylene chloride, ethylene chloride, carbon tetrachloride, chloroform, ethylene chlorohydrin, dichlorobenzene); and other compounds (e.g., N,N-dimethylformamide, hexane). These solvents may be used in arbitrary proportions. These organic solvents need not be 100% pure, and may contain impurities such as isomers, unreacted raw materials, by-products, decomposition products, oxidation products, and water, besides the main components. The content of these impurities is preferably 30% by weight or less, more preferably 10% by weight or less. If necessary, different organic solvents may be used in different amounts for forming an upper layer and a lower layer in the present invention. For example, it is possible to use a highly volatile solvent to form an upper layer having improved surface properties, to use a solvent with a high surface tension (e.g., cyclohexane, dioxane) to improve the stability of the coating for forming a lower layer, or to use a solvent with a high solubility parameter to increase loading. However, methods of using organic solvents are not limited to these examples.

The magnetic recording medium of the present invention is obtained by a process comprising kneading the above-described ferromagnetic particles and binder resin together with an organic solvent if necessary further with other optional additives, applying at least the resulting magnetic coating fluid on a nonmagnetic support, and drying the coating. Prior to the drying step, the ferromagnetic particles may be oriented, if necessary.

The process for preparing a magnetic coating fluid for producing the magnetic recording medium of the present invention comprises at least a kneading step and a dispersing step, and may further comprise a mixing step that may be conducted, if needed, before and after the two steps. Each step may include two or more stages. Each of the materials for use in the present invention, including the ferromagnetic particles, binder, carbon black, abrasive material, antistatic agent, lubricant, and solvent, may be added in any step either at the beginning of or during the step. Further, the individual raw materials may be added portion-wise in two or more steps. For example, a polyurethane may be added portion-wise in each of the kneading step, the dispersing step, and the mixing step for viscosity adjustment after the dispersion.

For kneading and dispersion for preparing a magnetic coating fluid, any of various kneading machines may be used. Examples thereof include a two-roll mill, three-roll mill, ball mill, pebble mill, tron mill, sand grinder, Szegvari, attritor, high-speed impeller dispersing machine, high-speed stone mill, high-speed impact mill, disper, kneader, high-speed mixer, homogenizer, and ultrasonic dispersing machine.

The nonmagnetic coating fluid for use in the present invention may be produced in the same manner as the magnetic coating fluid described above.

Conventionally known manufacturing techniques may be used as part of the process to attain the object of the present invention. However, the magnetic recording medium of the present invention can have a high $B_r$ only when a kneading machine having high kneading power, such as a continuous kneader or pressure kneader, is used in the kneading step. In the case of using a continuous kneader or pressure kneader, the ferromagnetic particles are kneaded together with all or part (preferably at least 30% by weight) of the binder, the binder amount being in the range of from 15 to 500 parts by weight per 100 parts by weight of the ferromagnetic particles. Details of this kneading treatment are given in JP-A-1-106338 and JP-A-1-79274.

The magnetic recording medium of the present invention is produced by coating a nonmagnetic support with the thus-prepared coating fluid for lower-layer formation and then with the thus-prepared coating fluid for upper-layer formation. For applying these coating fluids, the simultaneous double coating technique in which an upper coating layer is formed on a wet lower coating layer is preferably used because efficient production is possible with this technique. Examples of this simultaneous double coating technique are given in, e.g., JP-A-62-212933.

For calendering, plastic rolls having heat resistance may be used, such as epoxy, polyimide, polyamide, or polyimide-amide rolls. Metal rolls alone can also be used to conduct calendering. The calendering temperature is preferably 70° C. or more, more preferably 80° C. or more. The linear pressure is preferably 200 kg/cm or more, more preferably 300 kg/cm or more.

The residual solvent content in the upper layer in the magnetic recording medium of the present invention is preferably 100 mg/m$^2$ or less, more preferably 10 mg/m$^2$ or less. It is preferred that the residual solvent content in the upper layer be lower than that in the lower layer.

The void content in the lower layer and that in the upper layer are each preferably 30% by volume or less, preferably 10% by volume or less. The lower layer preferably has a higher void content than the upper layer, but may have a lower void content as long as its void content is 5% or more.

The magnetic recording medium of the present invention, which has a lower layer and an upper layer, can be made to have a difference in physical property between the upper layer and the lower layer according to purpose, as can be easily presumed. For example, the upper layer is made to have a heightened modulus to improve running durability and, at the same time, the lower layer is made to have a lower modulus than the upper layer to improve the head touching of the magnetic recording medium.

A composition for forming an upper layer and a composition for forming a lower layer each is dispersed along with a solvent. The coating fluids thus obtained are applied to a nonmagnetic support, and orientation and drying are conducted to form a magnetic layer on the nonmagnetic support. A surface-smoothing treatment may be performed if necessary. The resulting structure may be cut into a desired shape. Thus, the magnetic recording medium of the present invention is produced.

The magnetic recording medium of the present invention may be used as a floppy disk or magnetic disk for data recording or used for the analog recording of image information. The recording medium of this invention is particularly effective when used as a data-recording disk medium in which the occurrence of signal dropouts should be avoided by all means.

The present invention will be explained below in more detail by reference to the following examples, but it should be understood that the present invention is not to be construed as being limited thereto. Hereinafter all parts, percents, ratios and the like are by weight unless otherwise indicated.

EXAMPLES

EXAMPLE 1

| Lower Layer (Nonmagnetic Layer) | |
| --- | --- |
| Nonmagnetic particles: TiO$_2$ (average particle diameter, 35 nm; BET specific surface area, 40 m$^2$/g; pH, 6.6) | 80 parts |
| Carbon black (average particle diameter, 30 nm; | 10 parts |

-continued

| | |
|---|---|
| DBP absorption, 350 ml/100 g; BET specific surface area, 950 m²/g) | |
| Vinyl chloride copolymer (MR110, manufactured by Nippon Zeon Co., Ltd. (containing —$SO_3M$ and epoxy ring)) | 13 parts |
| Polyester polyurethane resin (neopentyl glycol/caprolactonepolyol/MDI = 0.9/2.6/1; containing 1 × $10^{-4}$ eq/g —$SO_3Na$ group) | 5 parts |
| $C_{17}H_{33}COO(CH_2)_4OCOC_{17}H_{33}$ (lubricant) | 5 parts |
| Methyl ethyl ketone | 200 parts |
| Upper Layer (Magnetic Layer) | |
| Ferromagnetic metal particles (composition, Fe/Ni = 94/6; $H_c$, 1,700 Oe; Crystallite size, 195 Å; $\sigma_s$, 130 emu/g; major-axis length, 0.20 µm; aspect ratio, 10) | 100 parts |
| Polyester polyurethane resin (neopentyl glycol/caprolactonepolyol/MDI = 0.9/2.6/1; containing 1 × $10^{-4}$ eq/g —$SO_3Na$ group) | 5 parts |
| α-Alumina (average particle diameter, 0.3 µm; BET specific surface area, 10 m²/g) | 5 parts |
| Carbon black (average particle diameter, 200 nm; DBP absorption, 30 ml/100 g; BET specific surface area, 10 m²/g) | 5 parts |
| $C_{17}H_{33}COO(CH_2)_4OCOC_{17}H_{33}$ (lubricant) | 5 parts |
| Methyl ethyl ketone | 200 parts |

With respect to each of the two coating fluids described above, the ingredients were kneaded with a continuous kneader and then dispersed with a sand mill. To the resulting dispersions was added Coronate 3041, manufactured by Nippon Polyurethane Industry Co., Ltd., Japan, in an amount of 10 parts (on a solid basis) for each of the lower-layer-forming coating fluid and the upper-layer-forming coating fluid. The dispersions were then filtered through a filter having an average opening diameter of 1 µm to prepare a coating fluid for forming a nonmagnetic layer and a coating fluid for forming a magnetic layer.

The nonmagnetic-layer-forming coating fluid and magnetic-layer-forming coating fluid thus obtained were applied by simultaneous double coating on a poly(ethylene terephthalate) support (thickness, 62 µm; center-line average surface roughness, 0.01 µm) primed with a polyester resin, as follows. The nonmagnetic coating fluid was applied first at a dry thickness of 2 µm, and the magnetic coating fluid was applied immediately thereafter in such an amount as to give a 0.3 µm-thick upper layer (magnetic layer). While the two layers were in a wet state, random orientation was performed by passing the coated support through two alternating-current magnetic-field generators, one of which had a frequency of 50 Hz and an intensity of magnetic field of 200 G and the other of which had a frequency of 50 Hz and an intensity of magnetic field of 120 G. The coating was dried and then calendered with metal rolls arranged in a seven-stage stack at a temperature of 90° C. and a linear pressure of 300 kg/cm. Thereafter, a 3.5-inch disk was punched from the resulting magnetic recording medium, subjected to a surface-polishing treatment, and then placed in a 3.5-inch cartridge which had been fitted inside with a liner. Necessary mechanical parts were attached to the cartridge to obtain a 3.5-inch floppy disk of Example 1.

EXAMPLES 2 TO 6 AND COMPARATIVE EXAMPLES 1 TO 8

Floppy disks were produced in the same manner as in Example 1, except that conditions were changed as shown in Table 1. Details are as follows.

COMPARATIVE EXAMPLE 1

In place of the lubricant used in Example 1, the lubricant shown in Table 1 was used, which had saturated fatty acid residues.

COMPARATIVE EXAMPLE 2

In place of the lubricant used in Example 1, the lubricant shown in Table 1 was used, in which each fatty acid residue had a small number of carbon atoms.

COMPARATIVE EXAMPLE 3

In place of the lubricant used in Example 1, the lubricant shown in Table 1 was used, in which each fatty acid residue had a large number of carbon atoms.

COMPARATIVE EXAMPLE 4

In place of the lubricant used in Example 1, the lubricant shown in Table 1 was used, in which the diol residue had a large number of carbon atoms.

EXAMPLE 2

In place of the lubricant used in Example 1, the lubricant shown in Table 1 was used, which had an unsaturated diol residue.

EXAMPLE 3

In place of the lubricant used in Example 1, the lubricant shown in Table 1 was used, in which the number of carbon atoms contained in each fatty acid residue was close to the lower limit.

EXAMPLE 4

In place of the lubricant used in Example 1, the lubricant shown in Table 1 was used, in which the number of carbon atoms contained in the diol residue was close to the upper limit.

COMPARATIVE EXAMPLE 5

The nonmagnetic layer in Example 1 was omitted, and the magnetic layer alone was formed at a dry thickness of 2 µm.

COMPARATIVE EXAMPLE 6

Oleyl oleate was used in place of the lubricant used in Example 1.

COMPARATIVE EXAMPLE 7

The lubricant amount in Example 1 was reduced.

EXAMPLE 5

The lubricant amount in Example 1 was changed.

COMPARATIVE EXAMPLE 8

A triester was used in place of the lubricant used in Example 1.

EXAMPLE 6

The lubricant amount in Example 1 was increased.

The floppy disks obtained were evaluated by the following methods, and the results obtained are shown in Table 1.

Evaluation Methods

Measurement of Reproduced Output: Signals were recorded with disk tester Type SK606B, manufactured by Tokyo Engineering Co., Ltd., on each floppy disk in its position corresponding to a radius of 24.6 mm using a metal-in gap head having a gap length of 0.45 μm at a recording frequency of 625 kHz. The recorded signals were then reproduced with a head amplifier, and the output of the reproduced signals was measured with oscilloscope Type 7633, manufactured by Techtronics Co. Each reproduced Bad: the magnetic layer surface had entirely developed a large number of fine mars.

The results are shown in Table 1 below.

TABLE 1

| Sample No. | Kind of lubricant | Lubricant amount in upper layer (parts) | Lubricant amount in lower layer (parts) | Reproduced output | Thermal cycle durability (×10⁴ passes) | Durability after storage (×10⁴ passes) | Liner wear |
|---|---|---|---|---|---|---|---|
| Ex. 1 | $C_{17}H_{33}COO(CH_2)_4OCOC_{17}H_{33}$ | 5 | 5 | 100 | ≧1800 | ≧1800 | good |
| Comp. Ex. 1 | $C_{17}H_{35}COO(CH_2)_4OCOC_{17}H_{35}$ | 5 | 5 | 90 | 500 | 350 | poor |
| Comp. Ex. 2 | $C_{11}H_{21}COO(CH_2)_4OCOC_{11}H_{21}$ | 5 | 5 | 89 | 670 | 200 | bad |
| Comp. Ex. 3 | $C_{27}H_{53}COO(CH_2)_4OCOC_{27}H_{53}$ | 5 | 5 | 88 | 860 | 540 | poor |
| Comp. Ex. 4 | $C_{17}H_{33}COO(CH_2)_{11}OCOC_{17}H_{33}$ | 5 | 5 | 89 | 780 | 420 | poor |
| Ex. 2 | $C_{17}H_{33}COOCH_2CH=CHCH_2OCOC_{17}H_{33}$ | 5 | 5 | 100 | ≧1800 | ≧1800 | good |
| Ex. 3 | $C_{14}H_{27}COO(CH_2)_2OCOC_{14}H_{27}$ | 5 | 5 | 93 | 1600 | 1400 | fair |
| Ex. 4 | $C_{14}H_{27}COO(CH_2)_8OCOC_{14}H_{27}$ | 5 | 5 | 99 | ≧1800 | ≧1800 | good |
| Comp. Ex. 5 | $C_{17}H_{33}COO(CH_2)_4OCOC_{17}H_{33}$ | 5 | — | 82 | 640 | 380 | poor |
| Comp. Ex. 6 | $C_{17}H_{33}COOC_{18}H_{35}$ | 5 | 5 | 88 | 980 | 780 | fair |
| Comp. Ex. 7 | $C_{17}H_{33}COO(CH_2)_4OCOC_{17}H_{33}$ | 0.3 | 0.3 | 99 | 1180 | 950 | poor |
| Ex. 5 | $C_{17}H_{33}COO(CH_2)_4OCOC_{17}H_{33}$ | 1 | 1 | 101 | ≧1800 | 1680 | good |
| Comp. Ex. 8 | $C_{18}H_{35}OCH(CH_2OC_{18}H_{35})_2$ | 5 | 2 | 99 | ≧1800 | ≧1800 | good |
| Ex. 6 | $C_{17}H_{33}COO(CH_2)_4OCOC_{17}H_{33}$ | 10 | 10 | 86 | 880 | 670 | fair | output measured is shown as a relative value, with the output for Example 1 being taken as 100.

Running Durability

Using floppy disk drive Type FD1331, manufactured by NEC Corp., signals were recorded on each floppy disk throughout all the 240 tracks at a recording frequency of 625 kHz. The floppy disk was then subjected, in its position corresponding to a radius of 37.25 mm from the center, to a thermal cycle test in which each cycle consisted of the following steps.

Under such thermal cycling conditions, the floppy disk was run for a maximum of 1,800×10⁴ passes. Thus, the running durability was evaluated in terms of the number of passes counted before the occurrence of sticking.

Thermal Cycle

25° C., 50% RH for 1 hour→(heating over 2 hours)→60° C., 20% RH for 7 hours→(cooling over 2 hours)→25° C., 50% RH for 1 hour→(cooling over 2 hours)→5° C., 50% RH for 7 hours→(heating over 2 hours)→<repeat these steps>

Storage Stability

Each floppy disk was stored at 60° C., 80% RH for 2 weeks, and then subjected to the thermal cycle test described above to evaluate storage stability.

Liner Wear Evaluation: Each sample was run for 1,800× 10⁴ passes in the same atmosphere as for whithe running durability evaluation, except that the head was kept off the magnetic disk. Thereafter, the cartridge was opened and the surface of the magnetic layer of the magnetic disk was visually examined to evaluate the liner wear.

Good: the magnetic layer surface had no defects.

Fair: the magnetic layer surface had partly developed fine mars.

Poor: the magnetic layer surface had entirely developed fine mars.

The results in Table 1 show that the magnetic recording medium provided by the present invention, which comprises a nonmagnetic support, a lower layer provided thereon and comprising nonmagnetic or ferromagnetic particles and a binder resin, and an upper layer provided on the lower layer and comprising ferromagnetic metal particles and a binder resin, can be (i) a magnetic recording medium in which the magnetic layer has an exceedingly smooth surface and satisfactory performances with respect to running properties, suitability for repetitions of running, and durability, (ii) a magnetic recording medium which shows high durability even when used and stored in a wide range of atmospheres and even when used in a dusty atmosphere, and (iii) a magnetic recording medium which has a reduced error rate even when used and stored in a wide range of atmospheres and even when used in a dusty atmosphere, since at least the upper layer contains a lubricant which is a diester of an unsaturated fatty acid with an optionally unsaturated diol and which has a specific structure with a regulated number of carbon atoms.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having provided thereon a lower layer comprising nonmagnetic or ferromagnetic particles and a binder resin, and an upper layer provided on the lower layer comprising ferromagnetic metal particles and a binder resin, wherein both said lower layer and said upper layer contains as a lubricant a compound represented by the following formula (1) in an amount in said upper layer of 1% by weight or more based on the amount of the ferromagnetic metal particles contained in said upper layer:

$$R^1-COO-R-OCO-R^2 \qquad (1)$$

wherein R is selected from the group consisting of a residue of a linear saturated diol containing from 1 to 10 carbon atoms, a residue of a branched saturated diol containing from 1 to 10 carbon atoms, and a residue of a linear unsaturated diol containing from 1 to 10 carbon atoms, or R represents

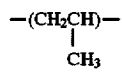

and $R^1$ and $R^2$ are the same or different and each represents a chain unsaturated hydrocarbon group having from 12 to 26 carbon atoms.

2. The magnetic recording medium as claimed in claim 1, wherein the ferromagnetic metal particles have a crystallite size of from 80 to 300 Å.

3. The magnetic recording medium as claimed in claim 1, wherein the ferromagnetic metal particles are elemental metals or alloys selected from the group consisting of Fe, Fe—Co, Fe—Ni or Fe—Ni—Co.

4. The magnetic recording medium as claimed in claim 1, wherein the upper layer has a thickness of from 0.05 to 1.0 µm.

5. The magnetic recording medium as claimed in claim 1, wherein the binder resin has at least polar group selected from the group consisting of —COOM, —SO$_3$M, —OSO$_3$M, —P=(OM)$_2$, —O—P=(OM)$_2$ in which M represents a hydrogen atom or an alkali metal salt.

6. The magnetic recording medium as claimed in claim 1, wherein said magnetic recording medium is a magnetic disk for data recording.

7. The magnetic recording medium as claimed in claim 1, wherein the nonmagnetic particles have any of acicular, spherical and cubical forms.

* * * * *